Patented Sept. 13, 1938

2,130,215

UNITED STATES PATENT OFFICE 2,130,215

TRANSPARENT GLASS COLORS

James H. Young, Elizabeth, N. J., assignor to E. I. du Pont de Nemours & Company, Wilmington, Del., a corporation of Delaware No Drawing. Application March 5, 1936, Serial No. 67,326. Renewed July 27, 1938

12 Claims. (Cl. 106—36.2)

This invention relates to a coloring composition for glass, porcelain, earthenware, and other materials. More specifically, it relates to a coloring composition especially suitable for application to pre-formed glass bodies which consists essentially of a soft glass or glaze containing a pigment. These low melting glasses, commonly termed "colors" in the industry, are ordinarily applied to the surface of a pre-formed piece of glassware or to similar ceramic surfaces. The body is then subjected to heat and the glass is melted to form an integral portion of the ware. This is a usual way of applying a surface color to articles of glass, porcelain, earthenware or similar ceramic bodies and coloring compositions of this type are usually termed glazes, fluxes or enamels.

This invention relates more particularly to the preparation of a color composition which when applied to the glass or porcelain and melted thereon, will result in a transparent color. As previously stated, it is now customary to apply a coloring composition such as a soft or low melting glass to the surface of a glass body and by melting form the color in place. However, all coloring compositions now known to the industry result in an opaque or non-transparent color. The invention herein disclosed, comprising a novel coloring composition which is applied to the surface to be colored and melted thereon, results in a transparent or translucent color.

Accordingly one of the objects of this invention is to provide a coloring composition which will furnish a transparent or translucent color when applied to articles to be coated, as distinguished from the usual glasses and enamels now known to the art which result only in opaque colored surfaces. Another object of this invention is to provide a coloring composition which when fused will not form discoloring compounds tending to destroy the color which it is desired to impart to the coated object by means of the low melting glass.

Other objects of this invention will be hereinafter apparent and will be pointed out.

Glasses, glazes, fluxes and enamels are commonly composed of modified silicates, borates or borosilicates. These compositions possess high melting points and in the preparation of soft glasses or low melting glazes for imparting color to a pre-formed glass, porcelain or other ceramic object, various materials have been added in order to lower the melting point. When applying a color to a glass object by melting a color composition on its surface, thereby forming the color integrally with the glass body, it is, of course, essential that the glaze melt at a temperature below the softening point of the glass object. Otherwise distortion or destruction of the glass object will result and it would be impossible to prepare a satisfactory coated article colored with the glaze.

Among the materials which are added for the purpose of lowering the melting point of the soft glass or glaze are the oxides of lead. The addition of lead oxide results in compositions which have many desirable characteristics and in fact the greater portion, if not all, of the glasses intended for application to pre-formed glass bodies consist of lead borosilicates. It is usual to incorporate into such compositions various coloring pigments to produce the desired color in the coated glass object. These pigments are normally oxides or salts of various metals which, after the glaze is fused, will result in formation of the desired color. My invention applies especially to the use of pigments of the metallic sulfide class.

This invention in its more specific aspects relates to the preparation of lead borosilicate glazes which, when melted, will impart to the coated object colors which range in hue from yellow to deep red. Moreover, these glazes will be transparent or translucent and not opaque as are the glazes now known to the art. To obtain these colors I introduce into the lead borosilicate glaze relatively small amounts of a pigment material such as a compound of cadmium, cadmium sulfide or cadmium sulfoselenide, together with an additional amount of a compound of cadmium such as cadmium carbonate or cadmium oxide. These coloring pigments are melted with the other ingredients in the low melting glaze and the melted mix then poured into water or fritted so that it is converted to a form in which it may be readily ground. After grinding, it is dried and then applied to the glass surface to be decorated which must be heated to develop the color, produce a glossy surface and bond the color to the article coated.

Pigments such as cadmium sulfide or cadmium sulfoselenide have been previously added to low melting glasses consisting essentially of lead borosilicate glazes. For example, a color composition for coating vitreous materials containing these pigments is described in the issued patent of Huber and Felton, No. 1,673,679. In the process therein disclosed, however, the coloring ingredients, i. e., the cadmium sulfide or the cadmium sulfoselenide, are not melted with the lead borosilicate flux but are added to the flux after it has been fritted. The cadmium oxide present with the other salts of cadmium is fritted with the ingredients comprising the lead borosilicate base in the process of that patent, but the cadmium sulfide or cadmium sulfoselenide is added as a "mill addition", after fritting. The products prepared in accordance with the method described in this patent are therefore opaque, and the transparent or translucent effects characteristic of this invention are not obtained by following the method therein described.

One of the reasons for the opacity of the glass colors now known to the art is that the cadmium sulfide or cadmium sulfoselenide pigment is added to the lead borosilicate base after that base has been melted and fritted. I have found that mill addition of the pigment, i. e. addition to the fritted base during milling, will not produce a transparent or translucent color. For transparency it is essential that the coloring compounds, cadmium sulfide or cadmium sulfoselenide, together with additional cadmium as cadmium oxide or cadmium carbonate, be melted with the glaze.

In the preparation of glazes in accordance with this invention I have found that it is also essential to avoid a reducing or oxidizing atmosphere during the melting process. This requires that the container in which the melt is prepared be kept closed or the melt protected from contact with the atmosphere in some other way. For example, a non-oxidizing atmosphere such as a nitrogen atmosphere may be employed. Moreover, it has been found essential to utilize a "non-oxidizing" lead compound or a compound of lead which will not liberate oxygen during the process of melting. As examples of "non-oxidizing" lead compounds suitable for use in my process may be mentioned white lead (basic lead carbonate) and litharge (PbO). Red lead (Pb$_3$O$_4$), has been found definitely unsatisfactory and if used in the melt will not produce the transparent or translucent color which is the aim of this invention. White lead, usually considered to be a basic lead carbonate, appears to act like an oxide of lead when melted in the flux.

It has also been found essential that the quantity of pigment added to the lead borosilicate glaze should not exceed about 5% by weight of the glaze. When using a pigment of the metallic sulfide type from about 2% to about 5% by weight is the amount which should be used. Ordinarily cadmium sulfide or cadmium sulfoselenide in amounts ranging from 2 to 5% by weight, based on the weight of the ingredients forming the flux or glaze, has been found sufficient. In any event about 5% of pigment by weight must not be exceeded if a translucent or transparent color is to be obtained. In the methods of the prior art, such as that represented by the patent previously referred to, much larger amounts of pigment are used and this results in the opaque enamels characteristic of those obtained prior to the invention herein described.

Furthermore it has been found that the time and temperature conditions under which the flux or glaze ingredients containing the pigment are melted have an important influence on the character of the resulting color. In addition to avoiding a reducing or oxidizing atmosphere and keeping the container in which the melt is prepared covered, it is essential that the temperature be carefully controlled. If the temperature during the melting stage is too high, when the color is applied to the glass object to be coated a burned-out effect will be obtained. If the temperature is too low an opaque color will be obtained. While it is difficult to make any definite statement as to the actual temperature of the melt, due to difficulties in observing this temperature, I have found that generally a temperature in excess of about 1100° C. will give a burned out color while one below 850° C. will give an opaque color. These temperatures are not to be considered as applicable to every batch of all lead borosilicate glazes but are merely given as illustrative. The invention is not to be regarded as limited to specific temperatures of melting for the reason that these temperatures are not accurately known nor are they the same for all the different batches encountered in carrying out the process of this invention. The foregoing values are given solely as a rough indication of the approximate temperature conditions prevailing during the melting stage in order that glass colors which will be transparent or translucent will result.

As previously indicated, not only must the temperature employed during the fritting operation be carefully regulated, but also the time of melting must be controlled. It is extremely difficult to give any definite numerical limits for the time required for heating, but both a suitable temperature and time may be very readily determined by making up a number of experimental batches employing different temperatures and periods of heating. These tests are very readily carried out experimentally. However, merely as an indication of certain temperatures and time periods found suitable under some conditions, the following table gives the time and temperature conditions employed in the fritting of certain illustrative batches:

| Batch | Wt. of batch | Approximate temperature °C. | Time of melting | Characteristics of color |
|---|---|---|---|---|
| 1 | 100 g. | 1000 | 15 min. | Color not dissolved. |
| 2 | 100 g. | 1000 | 20 min. | Do. |
| 3 | 100 g. | 1000 | 30 min. | Color satisfactory. |
| 4 | 100 g. | 1000 | 40 min. | Do. |
| 5 | 5 lbs. | 900 | 1 hr. and 15 min. | Color not dissolved. |
| 6 | 5 lbs. | 950 | 1 hr. and 15 min. | Color fired out—too much heat. |
| 7 | 5 lbs. | 1015 | ¼ hr. | Color fired out. |
| 8 | 5 lbs. | 1050–1100 | 35 min. | Color satisfactory. |
| 9 | 5 lbs. | 800 | 3 hrs. | Red opaque unsatisfactory color. |
| 10 | 5 lbs. | 850 | 3 hrs. | Satisfactory red transparent color. |
| 11 | 5 lbs. | 1200 | 1 hr. | Color burned out. |
| 12 | ¼ lb. | 1000 | 25 min. | Satisfactory red transparent color. |
| 13 | ¼ lb. | 1000 | 45 min. | Satisfactory red transparent color. |

To determine the time and temperature of heating it is therefore necessary to prepare several batches under different conditions and fire the finished color on a glass object to be coated. If the time period is not sufficiently long the color is not a transparent or translucent color and is unsatisfactory. If the time of heating is too long or the temperature too elevated, the color is burned out and is unsatisfactory. In the appended claims I have specified that the time and temperature of heating are such that a transparent glass color results and by this is meant not only that the color is not opaque as are the prior art colors, but that it is also not burned out. The term transparent is also intended to include products which are translucent, but is intended to exclude the opaque colors of the prior art.

To summarize the essential characteristics of my superior enamel or glaze and the manner in which the process of producing this improved product differs from those known to the prior art, it may be stated first that my product is transparent or translucent while the yellow or red glazes of the prior art containing cadmium sulfide or cadmium sulfoselenide as the pigment are all opaque. In order to obtain this transparent or translucent color it is necessary to select what is termed in this application a "non-oxidizing" lead compound. As examples of such non-oxidizing lead oxides, white lead and litharge may be given. Moreover, the coloring agent, which in my process may comprise cadmium sulfide or cadmium sulfoselenide and is preferably used in conjunction with another cadmium compound such as cadmium carbonate or cadmium oxide, is melted with the other ingredients comprising the glaze. Adding the cadmium sulfide or cadmium sulfoselenide as a mere addition after the lead borosilicate glaze has been fritted, which is the method now used in the art, will not result in a transparent or translucent glaze. It is moreover, necessary that a reducing or oxidizing atmosphere be avoided during the fritting process and that the melt be protected from air oxidation by keeping the container covered or by some other means. The time of heating and the temperature employed during the melting process must also be carefully regulated so that neither an opaque color is produced nor a burned out unsatisfactory color. As indicated, this normally requires that several trial batches be prepared and that experimentation be carried out until the glaze, when fired on the glass body to be coated, results in the desired transparent or translucent color. Finally the amount of pigment utilized must not exceed about 5% by weight of the ingredients in the batch and normally will fall within the range of 2 to 5%. This is much less pigment than is now used in preparing the opaque colors known to the art as will be apparent from Patent No. 1,673,679, which suggests the employment of approximately 17% of cadmium sulfide or cadmium sulfoselenide pigment in the glaze.

As examples of my improved transparent or translucent glaze and the method of manufacturing and using the same the following may be given:—

*Example 1*

The melt consisted of the following ingredients:—

|  | Grams |
|---|---|
| Litharge (PbO) | 686 |
| Boric acid (H$_3$BO$_3$) | 249 |
| Flint (SiO$_2$) | 120 |
| Cadmium carbonate (CdCO$_3$) | 94 |
| Cadmium sulfoselenide red pigment | 30 |

The mixture was placed in a suitable fire clay crucible and heated under substantially non-reducing and non-oxidizing conditions. During the heating the crucible was kept covered. The temperature of the melt was carefully regulated so as not to exceed about 1000° C. and the time of heating was sufficient to melt the batch and to result in uniform distribution of color throughout the melt.

The melt was then poured into a large volume of cold water which operation is known as "fritting". The finely divided powder resulting was removed from the water and dried. It was then placed in a ball mill with about 50% its weight of water and ground for 12 to 20 hours. The finely divided comminuted glaze was then removed from the mill and separated from the water by filtration. This was followed by drying at a temperature not exceeding about 212° F.

The finely ground color was then mixed with a medium comprising essentially 50% alcohol and 50% water. It was then applied to the surface of several glass objects to be coated by each of the three operations which are usual in applying color, spraying, printing and banding. The glassware was then heated in the usual manner. A glossy transparent red, decorative glaze was produced on the glass objects coated after the color had been allowed to melt thereon, run uniformly over the surface and then cool.

If necessary a number of different conditions of heating may be experimented with until the color applied to a glass surface to be decorated results in a satisfactory transparent color. Thus in this particular instance three different batches were heated to different temperatures for different periods of time and the suitability of each color was determined by application to a glass surface to be coated. The conditions described above, the temperature not exceeding about 1000° C. and the period of heating being just sufficient to disperse the color uniformly throughout the melt, have been found to give most satisfactory results.

The exact hue of the color depends on the particular cadmium sulfoselenide pigment which has been melted into the lead borosilicate glaze. The preparation of cadmium sulfoselenide pigments is well understood in the art of coloring ceramic objects and pigments which range in hue from orange to a deep maroon can readily be obtained. The principal difference between these pigments lies in the ratio of cadmium sulfide to cadmium sulfoselenide therein. Pigments which are high in cadmium sulfide tend to give yellow hues while those high in cadmium sulfoselenide tend to give shades approaching ruby in color.

*Example 2*

The following ingredients comprised the batch:—

|  | Grams |
|---|---|
| Litharge | 686 |
| Boric acid | 249 |
| Flint | 120 |
| Cadmium carbonate | 94 |
| Precipitated cadmium sulfide | 30 |

After processing as described in Example 1 and firing on a glass surface a yellow transparent coating was obtained. Here again several batches were experimented with trying different times and temperatures of melting in order that a satisfactory transparent color might be obtained. As previously indicated the temperature should preferably not exceed about 1000° C. and the period of heating should be just sufficient to distribute the pigment uniformly throughout the rest of the glaze.

While the invention has been illustrated by reference to a borosilicate glass base, it is not limited to such a base but may be used in connection with any suitable glass composition. The preparation of various low melting glazes is well known to the art and does not constitute any part of this invention. It may be stated that the only requirements for a satisfactory glaze are that it will melt at a temperature in the region of 1000° F., that it has sufficient stability so that it will not craze or crack when attached to the glass object coated, and that it will not crystallize when fired at temperatures in the neighborhood of 1070° F.

The exact amount of cadmium carbonate or cadmium oxide to be added may also be varied within certain limits. The quantity of cadmium carbonate should not be reduced too much as the color will not develop satisfactorily and may contain more or less black if the glaze is weak in this compound. On the other hand, too large an amount of the cadmium carbonate raises the melting point of the glaze and prevents the obtainment of the desired glossy surface. It has been found that amounts of cadmium carbonate or equivalent amounts of any other compound of cadmium such as cadmium oxide ranging from 1 to 10% by weight, based on the total weight of the glaze, will give satisfactory results.

The temperature which is necessary in melting the ingredients of the color together is one sufficiently high to melt the mixture to a relatively thin liquid and in practicing my invention I have employed temperatures ranging from 900 to 1200° C. The temperature employed and the time of melting are interdependent and also depend to a substantial extent upon the size of the batch, the characteristics of the container in which the batch is melted and other factors. If the mixture is not kept molten for a sufficient period of time the pigment does not dissolve in the mixture and transparency or translucency does not develop properly when the enamel or color is applied to the glass article to be coated. On the other hand long exposure at high temperature weakens, darkens and eventually burns out the color. The temperature and the time of melting which will give the best results can readily be determined by making a few experimental batches. In the appended claims the temperature and time of melting necessary are specified as those necessary to obtain a transparent or translucent color.

After melting and fritting the color is most satisfactorily ground in water. It cannot be ground in certain organic solvents such as acetone and alcohol for they have a deleterious effect upon it. Grinding which is prolonged substantially beyond that necessary to result in the required dispersion is disadvantageous, because impurities are introduced from the grinding equipment and the ground particles become so small that they are too reactive with the air and with the media in which they are applied.

The previously described 50% alcohol and 50% water mixture is a very satisfactory vehicle for dispersion of the color. It is also a very satisfactory spraying medium. However other mixtures such as one comprising steam distilled pine oil, copaiba balsam, and turpentine, have also given very satisfactory results for spraying and brushing. The use of highly reducing oils such as French fat oil and linseed oil should be avoided. The color is suspended in these or any other suitable vehicles and fired on the object to be coated at a temperature of about 1000 to 1070° F. for best results.

The novel coloring compositions described in this application are transparent or translucent enamels. Those universally known to the art until the present time have been opaque. Transparency or translucency is a very desirable characteristic in certain classes of color decoration. Moreover, the cost of these colors is substantially reduced in comparison with the previously known yellow, orange, and red colors prepared from cadmium sulfide or cadmium sulfoselenide pigments because in my process much smaller amounts of the pigments are used.

While transparent high melting glasses containing zinc have been previously prepared using cadmium sulfide or cadmium sulfide and selenium together with additional cadmium oxide it may be pointed out that the function of the cadmium in these compositions is to prevent the opalescence which the presence of zinc in the glazes tends to cause. This is said to be due to the precipitation of zinc sulfied in the high melting glass. Products of this sort are essentially different from the relatively low melting glazes with which this application is concerned.

Although this invention has been particularly described as applicable to the use of cadmium sulfide or cadmium sulfoselenide it will be obvious that the principle may be applied to the use of other oxides or salts and that the invention is not therefore limited to the precise composition herein disclosed. The appended claims are to be interpreted as including all equivalents coming within the scope of my invention.

In these claims I have used the term "substantially neutral" to describe the substantially non-oxidizing and substantially non-reducing condition under which the melt is prepared. The lead compounds in the batch are termed "non-oxidizing" lead compounds and the term is meant to include equivalents of the two lead compounds mentioned as suitable. Wherever the composition is described as one which will yield a transparent glaze the term is meant to include not only transparent but also glazes which may be more properly termed translucent. The transparent glaze will result, of course, when the composition is fired on an object to be coated and the language is to be so understood. By control of the temperature at which the batch is melted and the time during which it is to be subjected to the elevated temperature, control in the manner previously disclosed so that a transparent glass results is to be understood.

I claim:

1. A process for preparing a vitrifiable coloring composition which when applied to a glass object to be coated will result in a transparent color which comprises the steps of melting together a pigment of the metallic sulfide type in an amount not exceeding about 5% by weight of the batch, a compound having the same metallic radical as the sulfide coloring pigment, and a suitable low melting lead borosilicate glass base formed from a non-oxidizing lead compound, the melting being carried out under substantially neutral conditions, air being excluded from the vessel and the time and temperature employed during the melting being carefully controlled so that a transparent product will result when the vitrifiable composition is fired in use.

2. A process for preparing a vitrifiable coloring composition which when applied to a glass object to be coated will result in a transparent color which comprises melting together a pigment selected from the group which consists of cadmium sulfide and cadmium sulfoselenide in an amount not exceeding about 5% by weight of the batch, an additional cadmium compound, and a suitable low melting lead borosilicate glass base formed from a non-oxidizing lead compound, the melting being carried out under substantially neutral conditions, air being excluded from the vessel, and the time and temperature employed during the melting being carefully controlled so that a transparent product will result when the vitrifiable composition is fired in use.

3. A process for preparing a vitrifiable coloring composition which when applied to a glass object to be coated will result in a transparent color which comprises melting together a pigment selected from the group which consists of cadmium sulfide and cadmium sulfoselenide, the amount of said pigment not exceeding about 5% by weight of the batch, a cadmium compound selected from the group which consists of cadmium oxide and cadmium carbonate, and a suitable low melting lead borosilicate glass base formed from a non-oxdizing lead compound, the melting being carried out under substantially neutral conditions, atmospheric air being excluded from the vessel and the time of melting and the temperature at which the mixture is melted being so controlled that a transparent product will result when the vitrifiable composition is fired in use.

4. A process for preparing a vitrifiable coloring composition which when applied to a glass object to be coated will result in a transparent color which comprises the steps of melting together a pigment selected from the group which consists of cadmium sulfide and cadmium sulfoselenide, the amount of said pigment not exceeding about 5% by weight of the batch, a cadmium compound selected from the group which consists of cadmium oxide and cadmium carbonate, and a low melting lead borosilicate base formed from a non-oxidizing lead compound, the melting being carried out under substantially neutral conditions, air being excluded from the vessel and the time of melting and the temperature at which the melting is effected being so controlled that a transparent product will result when the vitrifiable composition is fired in use.

5. A process for preparing a vitrifiable coloring composition which when applied to a glass object to be coated will result in a transparent color which comprises melting together under substantially neutral conditions, air being excluded from the vessel in which the batch is melted, and the time of melting and the temperature to which the batch is subjected being carefully controlled so that a transparent product will result when the vitrifiable composition is fired in use, a batch which consists of a pigment selected from the group which consists of cadmium sulfide and cadmium sulfoselenide, a cadmium compound selected from the group which consists of cadmium oxide and cadmium carbonate, and a low melting lead borosilicate glass base formed from a non-oxidizing lead oxide selected from the group which consists of litharge and white lead.

6. A process for preparing a vitrifiable coloring composition which when applied to a glass object to be coated will result in a transparent color which comprises the steps of melting together a pigment of the metallic sulphide class, said pigment being present in an amount not exceeding about 5% by weight of the ingredients comprising the batch, an additional compound having the same metallic radical as the sulphide pigment, and a suitable low melting lead borosilicate glass base formed from a non-oxidizing lead compound, the melting being carried out under substantially neutral conditions, air being excluded from the vessel and the time and temperature employed during said melting being carefully controlled so that a transparent product will result upon firing, fritting said compound by pouring it into a medium in which it is rapidly cooled, grinding said product in order to produce a comminuted material, suspending said comminuted material in a suitable vehicle, applying said coloring composition to the glass object to be coated, and firing at a temperature below the fusion point of the glass object.

7. A process for preparing a transparent glossy colored coating upon a glass object to be coated which comprises the steps of melting together a pigment selected from the group which consists of cadmium sulphide and cadmium sulfoselenide, the amount of said pigment not exceeding about 5% by weight of the batch, a cadmium compound selected from the group which consists of cadmium oxide and cadmium carbonate, and a suitable low melting lead borosilicate glass base formed from a non-oxidizing lead compound, the melting being carried out under substantially neutral conditions, air being excluded from the vessel and the time of melting and the temperature employed during melting being carefully controlled so that upon firing a transparent product will result, causing said molten composition to rapidly cool in partially comminuted form, grinding said product in order to obtain a powdered product, suspending said powdered material in a suitable vehicle, applying said coloring composition suspended in said vehicle to the surface of the object to be coated, and firing at a temperature of about 1000–1070° F., whereby a glossy transparent color results.

8. A process for preparing a transparent, glossy, colored coating upon a glass object to be coated which comprises the steps of melting together a pigment selected from the group which consists of cadmium sulphide and cadmium sulfoselenide, the amount of said pigment not exceeding about 5% by weight of the batch, a cadmium compound selected from the group which consists of cadmium oxide and cadmium carbonate, and a low melting lead borosilicate base, and a non-oxidizing lead compound, the melting being carried out under substantially neutral conditions, air being excluded from the vessel and the time of melting and temperature employed being carefully controlled so that a transparent product will result, causing said product to cool rapidly so that a partially comminuted product results, grinding said partially comminuted material, suspending said comminuted material in a suitable vehicle, applying the color suspended in said vehicle to the surface of the object to be coated, and firing at a temperature of about 1000–1070° F., whereby a transparent glossy colored coating results.

9. A transparent vitrifiable coloring composition containing a pigment selected from the group which consists of cadmium sulphide and cadmium sulfoselenide, a cadmium compound selected from the group which consists of cadmium oxide and cadmium carbonate, fritted together with a low melting non-oxidizing lead borosilicate glass, the pigment being present in amounts not exceeding about 5% by weight of the composition.

10. A transparent vitrifiable coloring composition containing cadmium sulphide, a cadmium compound selected from the group which consists of cadmium oxide and cadmium carbonate, fritted together with a low melting non-oxidizing lead borosilicate glass, the amount of cadmium sulphide present ranging from about 2 to 5% by weight of the composition.

11. A transparent vitrifiable coloring composition containing cadmium sulfoselenide, a cadmium compound selected from the group which consists of cadmium oxide and cadmium carbonate, fritted together with a low melting non-oxidizing lead borosilicate glass, the amount of cadmium sulfoselenide present ranging from about 2 to 5% by weight of the composition.

12. As a new article of manufacture, a preformed glass object coated with a transparent vitrifiable colored composition containing a pigment selected from the group which consists of cadmium sulphide and cadmium sulfoselenide fritted together with a low melting non-oxidizing lead borosilicate glass, said pigement being present in amounts not over 5% by weight of the composition.

JAMES H. YOUNG.